US009336058B2

(12) United States Patent
Balmin et al.

(10) Patent No.: US 9,336,058 B2
(45) Date of Patent: May 10, 2016

(54) AUTOMATED SCHEDULING MANAGEMENT OF MAPREDUCE FLOW-GRAPH APPLICATIONS

(71) Applicant: International Business Machines Corporation, Armonk, NY (US)

(72) Inventors: Andrey Balmin, San Jose, CA (US); Kirsten W. Hildrum, Hawthorne, NY (US); Viswanath Nagarajan, East Rutherford, NJ (US); Joel L. Wolf, Golden Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/804,171

(22) Filed: Mar. 14, 2013

(65) Prior Publication Data
US 2015/0269001 A1    Sep. 24, 2015

(51) Int. Cl.
G06F 9/46    (2006.01)
G06F 9/50    (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| 8,239,847 | B2 | 8/2012 | Yu et al. | |
|---|---|---|---|---|
| 8,321,558 | B1* | 11/2012 | Sirota et al. | 709/224 |
| 2011/0055843 | A1* | 3/2011 | Keeton | G06F 9/4881 718/104 |
| 2011/0239017 | A1* | 9/2011 | Zomaya et al. | 713/320 |
| 2011/0276962 | A1 | 11/2011 | Chambers et al. | |
| 2012/0057191 | A1* | 3/2012 | Gnanasambandam et al. | 358/1.15 |
| 2012/0158816 | A1 | 6/2012 | Choi et al. | |
| 2012/0284727 | A1* | 11/2012 | Kodialam et al. | 718/103 |
| 2013/0014101 | A1* | 1/2013 | Ballani et al. | 718/1 |
| 2013/0124466 | A1* | 5/2013 | Naidu | G06F 17/30575 707/610 |
| 2013/0263142 | A1* | 10/2013 | Miyamae | 718/102 |
| 2013/0290972 | A1* | 10/2013 | Cherkasova | G06F 9/5083 718/103 |
| 2013/0339972 | A1* | 12/2013 | Zhang et al. | 718/104 |
| 2014/0019987 | A1* | 1/2014 | Verma | G06F 9/5038 718/103 |
| 2014/0033223 | A1* | 1/2014 | Swart et al. | 718/105 |

OTHER PUBLICATIONS

Moseley, Benjamin et al. "On Scheduling in Map-Reduce and Flow-Shops". SPAA'11 ACM. Jun. 4-6, 2011.*

(Continued)

*Primary Examiner* — Adam Lee
(74) *Attorney, Agent, or Firm* — Ryan, Mason & Lewis, LLP

(57) ABSTRACT

Techniques, systems, and articles of manufacture for automated scheduling management of MapReduce flow-graph applications. A method includes determining a job schedule of MapReduce jobs within each of multiple MapReduce flows in a cluster environment, wherein said job schedule does not violate a precedence relationship within the corresponding MapReduce flow and reduces makespan of the corresponding MapReduce flow, determining a flow schedule for the multiple MapReduce flows based on consideration of a given metric, wherein said flow schedule comprises a number of slots allotted to each of the multiple MapReduce flows, and wherein said number of slots is less than or equal to a number of the one or more MapReduce jobs within each corresponding MapReduce flow, and transforming each job schedule into the flow schedule to allocate resources for the multiple MapReduce flows in the cluster environment without violating a precedence constraint of the multiple MapReduce flows.

22 Claims, 10 Drawing Sheets

(56) References Cited

OTHER PUBLICATIONS

Zeng, Linfang et al. "ScaleStar: Budget Conscious Scheduling Precedence-Constrained Many-task Workflow Applications in Cloud". 26$^{th}$ IEEE International Conference on Advanced Information Networking and Applications. 2012.*

Kavulya, Soila et al. "An Analysis of Traces from a Production MapReduce Cluster". Parallel Data Laboratory Carnegie Mellon University. Dec. 2009.*

Verma, Abhishek et al. "Deadline-based Workload Management for MapReduce Environments: Pieces of the Performance Puzzle". NOMS 2012: 13th IEEE/IFIP Network Operations and Management Symposium, Maui, Hawaii, USA, Apr. 16-20, 2012.*

Cherkasova, Ludmila et al. "Two Sides of a Coin: Optimizing the Schedule of MapReduce Jobs to Minimize Their Makespan and Improve Cluster Performance". HP Laboratories, Jun. 6, 2012.*

\* cited by examiner

COMPLETION TIME

NUMBER OF TARDY FLOWS

TARDINESS

SLA COSTS

FIG. 4

```
                                                              ╭402
1:  for j = 1, ..., m do
2:    Compute Stage 1 scheme on flow j.
3:  end for
4:  Stage 2 scheme begins.
5:  if minsum objective then
6:    Solve mincost network flow algorithm.
7:    for 1 = 1, ..., m do
8:      Compute deadline for chain j.
9:    end for
10:   Perform greedy scheme.
11: else
12:   Set success = 0 and o= lower bound.
13:   while success == 0 do
14:     for j = 1, ..., m do
15:       Compute argmax deadline for chain j using o.
16:     end for
17:     Perform greedy scheme.
18:     if Greedy scheme is feasible then
19:       Set success=1;
20:     else
21:       Set o = 2o.
22:     end if
23:   end while
24:   Set lastsuccess = o and lastfail = o/2.
25:   while lastsuccess - lastfail > 1 do
26:     Set o = (lastsuccess + lastfail)/2.
27:     for j = 1, ..., m do
28:       Compute argmax deadline for chain j using o.
29:     end for
30:     Perform greedy scheme.
31:     if Greedy scheme is feasible then
32:       Set lastsuccess = o.
33:     else
34:       Set lastfail = o.
35:     end if
36:   end while
37: end if
38: Stage 2 scheme ends.
39: Stage 3 Shapeshifting algorithm using Stages 1 and 2.
```

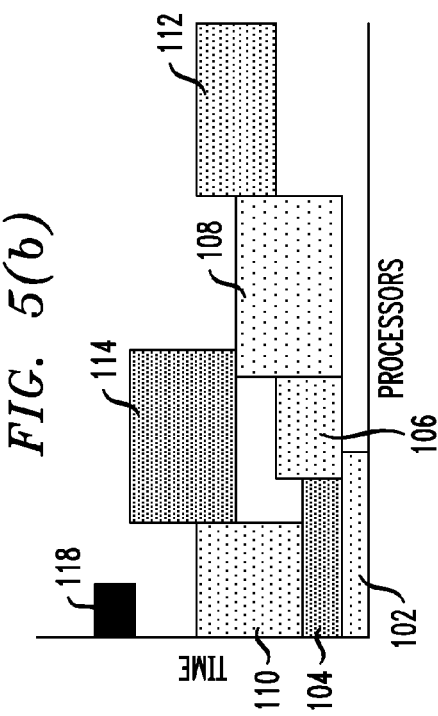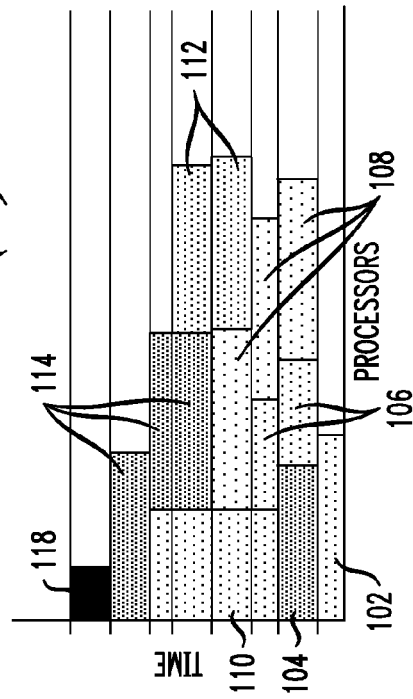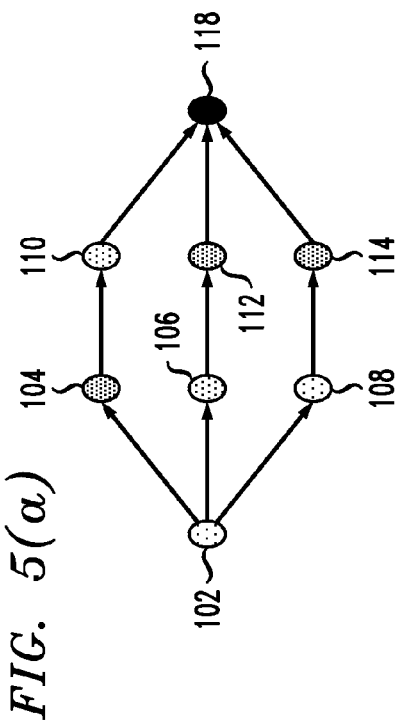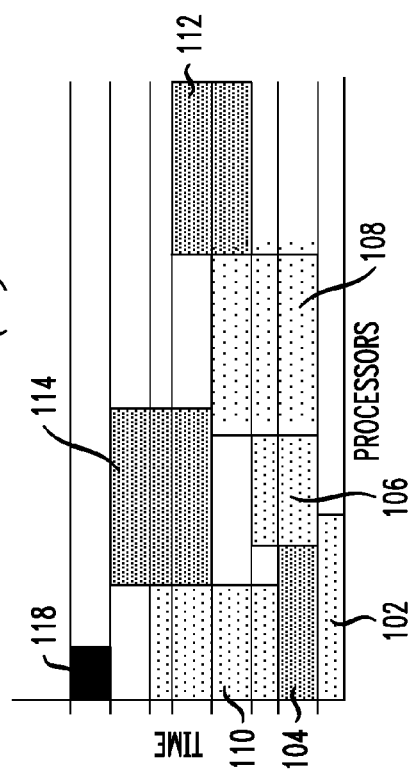
FIG. 5(a)
FIG. 5(b)
FIG. 5(c)
FIG. 5(d)

1: Initialize utilization function $\sigma : [0, \infty) \to \{0, 1, \ldots, P\}$ to zero.
2: for $j = 1, \ldots, m$ do
3:   for $i = 1, \ldots, n(j)$ do
4:     set $S(\tau_i^j) \leftarrow C(\tau_{i-1}^j)$ and initialize $\tau_i^j : [0, \infty) \to \{0, \ldots, P\}$ to zero.
5:     for each time $t \geq S(\tau_i^j)$ (in increasing order), set $\tau_i^j(t) \leftarrow \min\{P - \sigma(t), \delta(k_i^j)\}$, until $\int_{t \geq S(\tau_i^j)} \tau_i^j(t) dt = s(k_i^j)$.
6:     Set $C(\tau_i^j) \leftarrow \max\{z : \tau_i^j(z) > 0\}$.
7:     Update function $\sigma \leftarrow \sigma - \tau_i^j$.
8:   end for
9:   Set $C(\tau^j) \leftarrow C(\tau_{n(j)}^j)$.
10:   if $C(\tau^j) > 2 \cdot d_j$ then
11:     Instance is *infeasible*.
12:   end if
13: end for

WHEN UNSPECIFIED, cost = 0, cap = ∞.

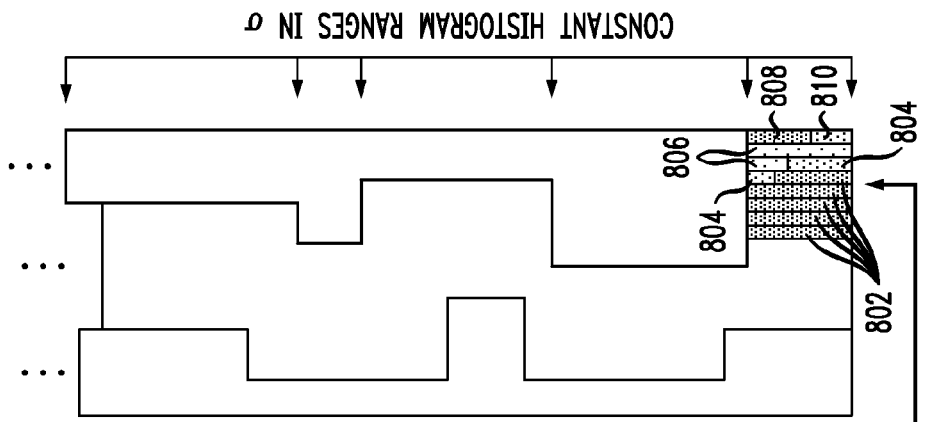
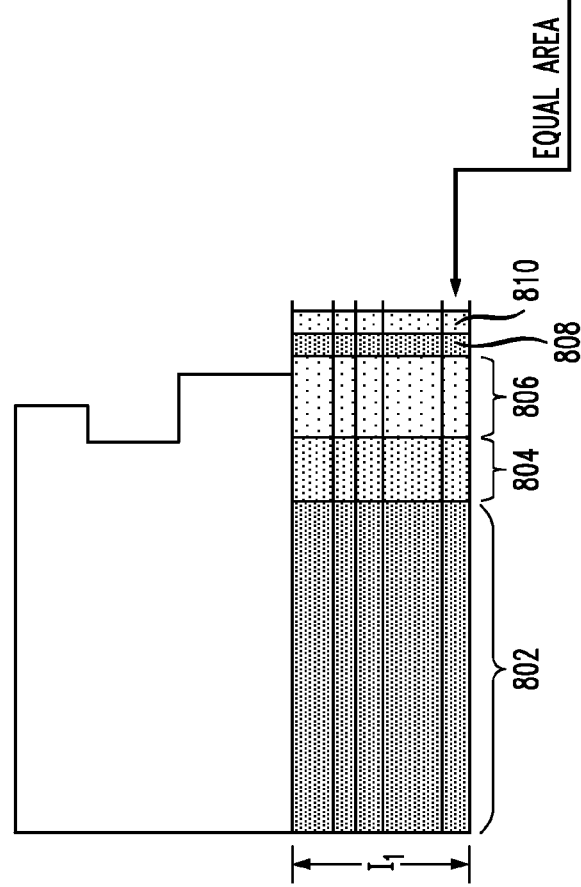

AUTOMATED SCHEDULING MANAGEMENT OF MAPREDUCE FLOW-GRAPH APPLICATIONS

GOVERNMENT CONTRACT

This invention was made with Government support under Contract No. H98230-11-C-0276 awarded by Department of Defense (DOD). The Government has certain rights in this invention.

FIELD OF THE INVENTION

Embodiments of the invention generally relate to information technology, and, more particularly, to distributed computing.

BACKGROUND

MapReduce is an important programming paradigm for processing large data. Accordingly, there has been work in the area of design of MapReduce schedulers. All existing scheduling approaches have focused on the scheduling of collections of singleton MapReduce jobs, as single MapReduce jobs were originally an appropriate atomic unit of work. More recently, however, more elaborate MapReduce work has emerged, and currently it is common to see the submission of flows of interconnected MapReduce jobs. Each flow can be represented by a directed acyclic graph in which the nodes are singleton MapReduce jobs and the directed arcs represent precedence. This means that the atoms have become molecules: the flows have become the basic unit of MapReduce work, and it is the completion time of the flows that commonly determines the appropriate measure of quality, not the completion times of the individual MapReduce jobs.

Previous parallel scheduling implementations and theoretical results include what are referred to as rigid jobs. These jobs run on a fixed number of processors (also referred to herein as slots) and are presumed to complete their work simultaneously. One can thus think of a job as corresponding to a rectangle whose width corresponds to the number of processors p, whose height corresponds to the execution time t of the job, and whose area, $s=p \cdot t$, corresponds to the work performed by the job.

Early work focused on the makespan metric, while subsequent parallel scheduling research included additional considerations. One such consideration involved moldable scheduling, wherein each job can be run on an arbitrary number of processors, but with an execution time that is a monotone non-increasing function of the number of processors. Thus the width of a job is changed from an input parameter to a decision variable. Additionally, with respect to another consideration, malleable scheduling, the number of processors allocated to a job is allowed to vary over time. However, each job must still perform its fixed amount of work.

Accordingly, existing approaches for scheduling simultaneous MapReduce work on a distributed cluster of processors typically include slot-based approaches. Such scheduling techniques favor time of arrival, while others favor notions of fairness.

However, MapReduce work is typically initiated in the form of flow-graph applications rather than single MapReduce jobs. These flow-graphs commonly include nodes describing MapReduce jobs, with directed arcs corresponding to precedence relations between the jobs. Additionally, it is often the completion time of the entire flow-graph, as noted above, that is of importance to the user submitting the application. Moreover, the completion times of individual MapReduce jobs themselves are often not overly relevant because the individual MapReduce jobs are commonly steps on a path to a larger goal. Accordingly, a need exists for scheduling management of overall MapReduce flow-graph applications, with the additional goal of optimizing metrics based on completion times of such applications.

SUMMARY

In one aspect of the present invention, techniques for automated scheduling management of MapReduce flow-graph applications are provided. An exemplary computer-implemented method can include steps of determining a job schedule of one or more MapReduce jobs within each of multiple MapReduce flows in a cluster environment, wherein said job schedule does not violate a precedence relationship within the corresponding MapReduce flow and reduces makespan of the corresponding MapReduce flow. The method additionally includes determining a flow schedule for the multiple MapReduce flows based on consideration of a given metric, wherein said flow schedule comprises a number of slots allotted to each of the multiple MapReduce flows, and wherein said number of slots is less than or equal to a number of the one or more MapReduce jobs within each corresponding MapReduce flow. Further, the method includes transforming each job schedule into the flow schedule to allocate resources for the multiple MapReduce flows in the cluster environment without violating a precedence constraint of any of the multiple MapReduce flows.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating a high-level scheme overview, according to an aspect of the invention;

FIG. 5 is a diagram illustrating a first stage of the techniques detailed herein, according to an aspect of the invention;

FIG. 6 is a diagram illustrating a greedy algorithm for scheduling chains with a strict deadline metric, a component of the second stage, according to an aspect of the invention;

FIG. 8 is a diagram illustrating a third stage of the techniques detailed herein, according to an aspect of the invention;

DETAILED DESCRIPTION

As described herein, an aspect of the present invention includes optimizing slot-based scheduling of flow-graph applications of MapReduce jobs. As further detailed herein, at least one embodiment of the invention includes allocating resources for multiple MapReduce flows in a cluster environment in a continuously adaptive manner to optimize a given metric associated with the completion time of each flow. As used herein, a flow-graph includes nodes describing MapReduce jobs with relations between those jobs. Accordingly, at least one embodiment of the invention includes providing automatic scheduling of MapReduce jobs based on MapReduce flow-graph completion times.

Figure 1:
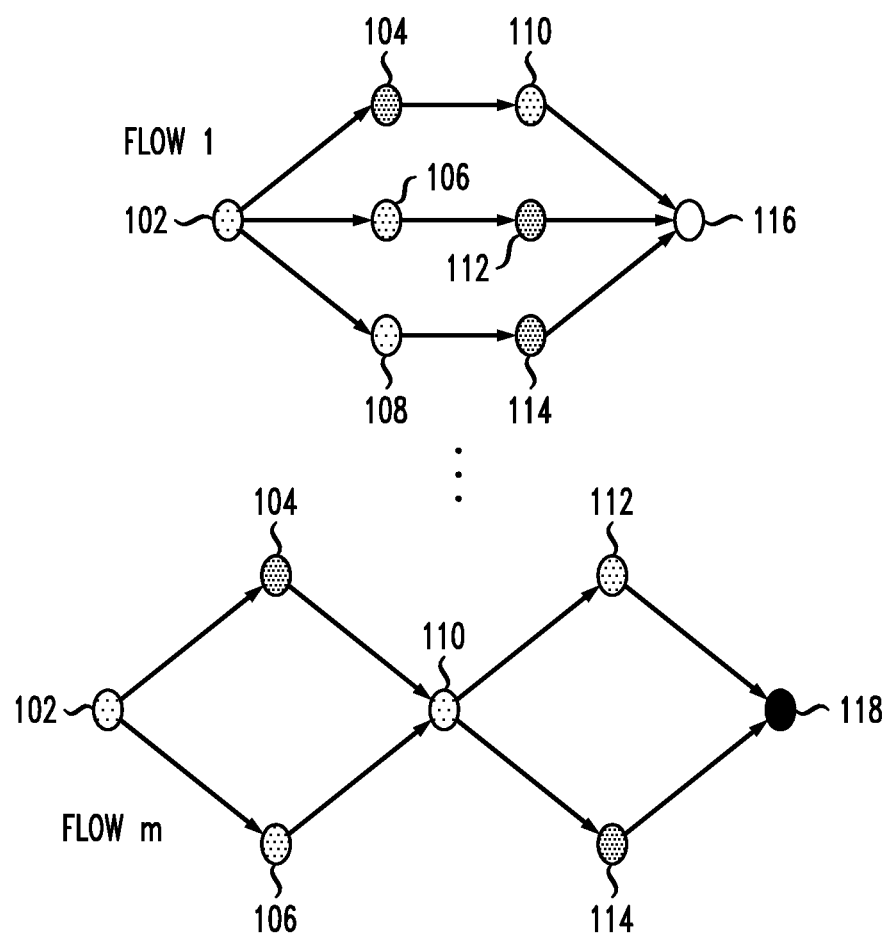
FIG. 1 is a diagram illustrating example MapReduce flows, according to an aspect of the invention.

As noted, an aspect of the invention considers the problem of scheduling MapReduce workloads. For example, FIG. 1 is a diagram illustrating example MapReduce flows, according to an aspect of the invention. Specifically, FIG. 1 depicts a set of flows of MapReduce jobs. It is the completion of the last job in each flow that will determine the quality of the overall schedule.

As depicted in FIG. 1, in flow 1, job 102 precedes jobs 104, 106 and 108. Job 104 precedes job 110. Job 106 precedes job 112. Job 108 precedes job 114. Additionally, jobs 110, 112 and 114 precede job 116, the last job in flow 1. In flow m, job 102 precedes jobs 104 and 106. Jobs 104 and 106 precede job 110. Job 110 precedes jobs 112 and 114. Additionally, jobs 112 and 114 precede job 118, the last job in flow m.

A workload includes multiple independent applications (or flows), and each flow is itself a set of MapReduce jobs with precedence constraints. As detailed herein, this can be modeled as a parallel scheduling problem, and more specifically, as precedence constrained malleable scheduling with linear speed-up and processor maxima. Each flow is associated with an arbitrary cost function that describes the cost incurred for completing the flow at a particular time. An objective of at least one embodiment of the invention includes minimizing the total cost (minisum) or the maximum cost (minimax) of the flows. As further described herein, a schedule includes an allocation of slots to the various jobs and flows over time. Related but distinct schemes can be provided for the minisum and minimax scheduling problems.

Figure 2:
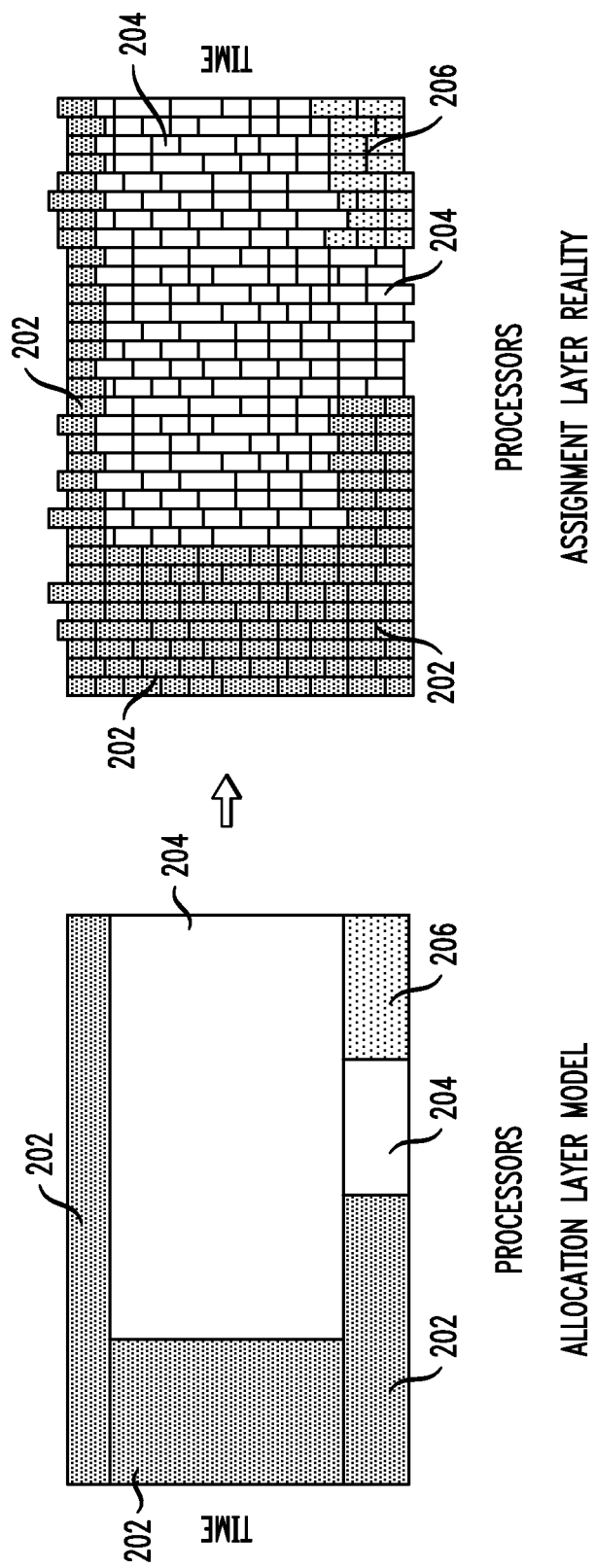
FIG. 2 is a diagram illustrating MapReduce and malleable scheduling, according to an aspect of the invention.
Figure 3A:
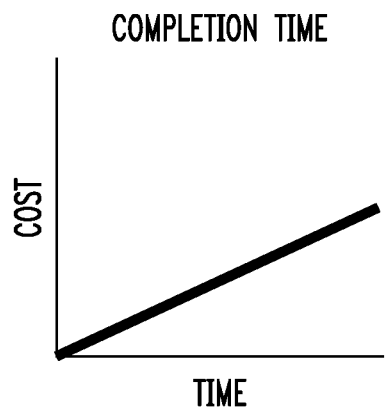
FIG. 3 illustrates example cost function types, according to an aspect of the invention.
Figure 3B:
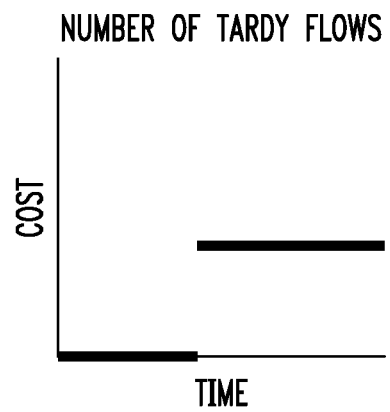
Figure 3C:
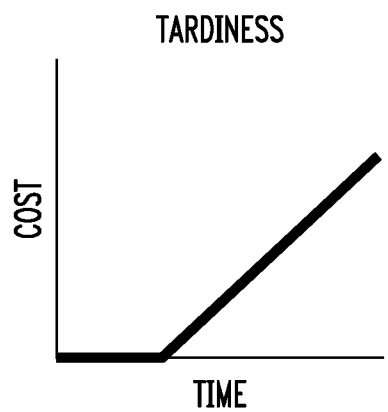
Figure 3D:
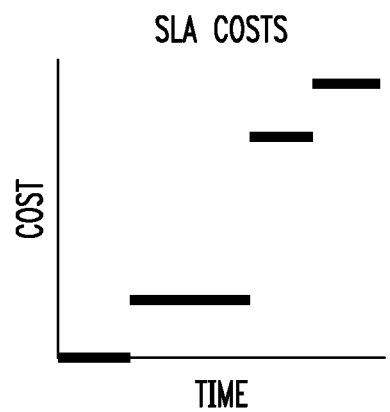

As also described herein, the Map and Reduce phases can be composed of many small, independent tasks. Because the two phases are independent, they do not need to start simultaneously and they can be processed with any degree of parallelism without significant overhead. This, in turn, means that the jobs will have nearly linear speed-up. Because the tasks can be many and small, the decisions of the scheduler can be closely approximated. By way of example, consider FIG. 2, which depicts the assignment layer implementing the decisions of the allocation layer. In FIG. 2, the allocation layer output is a hypothetical malleable schedule for three jobs. The assignment layer works locally at each node in the cluster.

Suppose, for example, a task on a node completes, freeing a slot. The assignment layer determines which job is the most relatively under-allocated according to the allocation layer schedule, and acts greedily, assigning a new task from that job to the slot. Examining FIG. 2, the tasks 202, 204 and 206 are represented as "bricks" in the assignment layer. As illustrated, the large number and small size of the tasks makes the right-hand side image a close approximation to the left-hand side image in FIG. 2. That is, in at least one embodiment of the invention, assignment layer reality is an excellent approximation to allocation layer theory.

Accordingly, MapReduce workloads are implemented with malleable scheduling with linear speedup and processor maxima, for example, because there is a natural decoupling of MapReduce scheduling into an allocation layer followed by an assignment layer. In the allocation layer, quantity decisions are made, and that is where the mathematical complexity resides. The assignment layer implements these allocation decisions (to the extent possible) in the MapReduce cluster. For example, as illustrated in FIG. 2, the malleable schedule computed for flow 202 in the allocation layer can be implemented via the tasks in the assignment layer. Likewise, the malleable schedule computed for flows 204 and 206 can be implemented via the tasks in the assignment layer.

As further detailed below, at least one embodiment of the invention includes implementing a set of scheduling algorithms for flows of MapReduce jobs in the context of a wide variety of scheduling metrics, each of which being based on the completion times of the flows. Example scheduling metrics can include makespan, average completion time, average and maximum stretch and metrics involving one or more deadlines. Any given metric will be appropriate for a particular scenario, and the algorithm applied will depend on the choice of metric. For example, in a batch environment, makespan may be emphasized to ensure that the batch window is not elongated. In an interactive environment, users would typically focus on completion time.

FIG. 3 illustrates example cost function types, according to an aspect of the invention. Specifically, FIG. 3(a) illustrates the basic form of completion time cost functions. Also, FIG. 3(b) illustrates the cost function for a tardy job, while FIG. 3(c) illustrates tardiness. Additionally, FIG. 3(d) illustrates the cost function for service level agreement costs.

By way of example, the following notation is used herein to describe aspects of one or more embodiments of the invention. There are P identical processors that correspond to resources (slots) in the MapReduce cluster. There are m flows. Each flow j is described by means of a directed acyclic graph. The nodes in each of these directed acyclic graphs are jobs, and the directed arcs correspond to precedence relations. The standard notation $i_1 < i_2$ is used to indicate that job $i_1$ must be completed before job $i_2$ can begin. Each job i must perform a fixed amount of work $s_i$ (also referred to as the job size), and can be performed on a maximum number $\delta_i \in [P]$ of processors at any point in time. Jobs have linear speed-up through their maximum numbers of processors: the rate at which work is done on job i at any time is proportional to the number of processors $p\Sigma[\delta_i]$ assigned thereto. Job i is complete when $s_i$ units of work have been performed.

At least one embodiment of the invention includes producing malleable schedules. In this setting, a schedule for job i is given by a function $\tau_i:[0, \infty) \to \{0, 1, \ldots, \delta_i\}$, where $\int_{t=0}^{\infty} \tau_i(t)dt = s_i$. Note that this satisfies both linear speed-up and processor maxima. The start time of schedule $\tau_i$ is denoted by $S(\tau_i) := \arg\min\{t \geq 0 : \tau_i(t) > 0\}$; similarly, the completion time is denoted $C(\tau_i):= \arg \max\{t \geq 0 : \tau_i(t) > 0\}$. A schedule for flow j (which includes jobs $I_j$) is given by a set $\{\tau_i : i \in I_j\}$ of schedules for its jobs, where $C(\tau_{i_1}) \leq S(\tau_{i_2})$ for all $i_1 \prec i_2$. The completion time of flow j is $\max_{i \in I_j} C(\tau_i)$, the maximum completion time of its jobs. Also, there are two natural and standard lower bounds on the minimum possible completion time of a single flow j:

Total load (or squashed area):

$$\frac{1}{P} \sum_{i \in I_j} s_i$$

and

Critical path: the maximum of $$\sum_{r=1}^{\ell} \frac{s_{i_r}}{\delta_{i_r}}$$

over all chains $i_1 \prec i_2$ in flow j.

Each flow j also specifies an arbitrary non-decreasing cost function $\omega_j : \mathfrak{R}_+ \to \mathfrak{R}_+$ where $w_j(t)$ is the cost incurred when job j is completed at time t. At least one embodiment of the invention can handle both minisum and minimax objective functions. The minisum (resp. minimax) objective minimizes the sum (resp. maximum) of the cost functions over all flows. These problems can be collectively referred to herein as precedence constrained malleable scheduling with linear speed-up. This general cost model can solve commonly used scheduling objectives including weighted average completion time, makespan (maximum completion time), average and maximum stretch, and deadline-based metrics associated with number of tardy jobs, service level agreements, etc.

The scheduling algorithm implemented in accordance with at least one embodiment of the invention includes three sequential stages, described at a high level as follows.

The first stage considers each flow j separately, and converts the precedence constraints for each flow into a chain of precedence constraints. As used herein, a chain precedence on elements $\{e_i : 1 \leq i \leq n\}$ is a total order, such as $e_1 \prec e_2 \prec \ldots \prec e_n$. This first stage additionally creates a pseudo-schedule for each flow that assumes an infinite number of processors, but respects precedence constraints and the bounds $\delta_i$ on jobs i. Also, in this first stage, the pseudo-schedule is partitioned into a chain of pseudo-jobs, where each pseudo-job k corresponds to a maximal interval in the pseudo-schedule with uniform processor usage. Just like the original jobs, each pseudo-job k specifies a size $s_k$ and bound $\delta_k$ of the maximum number of processors on which it can be run. However, unlike jobs, the bound $\delta_k$ of a pseudo-job may be larger than P.

The second stage treats each flow as a chain of pseudo-jobs, and obtains a malleable schedule of pseudo-jobs. This stage has two components. The first component includes obtaining a bi-criteria approximation algorithm in the special case of metrics based on strict deadlines, employing a natural greedy scheme. The second component includes obtaining a schedule for general cost metrics, by reduction to strict deadline metrics. For minisum cost functions, the second stage includes formulating a minimum cost flow sub-problem based on the cost metric, which can be solved efficiently. The solution to this sub-problem is used to derive a deadline for each flow, wherein the deadline is to be used in the greedy scheme. For minimax cost metrics, it is not necessary to solve a minimum cost flow problem. Instead, the scheme uses a bracket and bi-section scheme, each phase of which produces natural deadlines for each chain, and which involves solving the greedy scheme multiple times. At this point (that is, after stage two), a malleable schedule for the pseudo-jobs has been produced, satisfying the chain precedence within each flow as well as the bounds $\delta_k$.

The third stage combines stages one and two. Specifically, the third stage includes transforming the malleable schedule of pseudo-jobs into a malleable schedule for the original jobs, while respecting the precedence constraints and bounds $\delta_i$. This is referred to herein as shape shifting. Specifically, this stage includes converting the malleable schedule of each pseudo job k into a malleable schedule for the (portions) of jobs i for which it comprises.

FIG. 4 is a diagram illustrating a high-level scheme overview 402, according to an aspect of the invention. Stage one (noted above) is described in lines 1-3 and stage 2 is described in lines 4-38. In particular, the minisum objective option is described in lines 5-10. Note the minimum cost network flow problem in line 6, the computation of the deadlines in lines 7-9, and the greedy scheme employed in line 10. The minimax objective function is described in lines 11-37. Also, note the bracket component in lines 12-23, including multiple applications of the greedy scheme on line 18. Further, the bisection component is described in lines 24-35, including multiple applications of the greedy scheme in line 30. Stage three is described in line 39. Accordingly, additional details of each stage are given below.

As described herein, the first stage of at least one embodiment of the invention includes converting general precedence constraints to chains. A procedure to convert an arbitrary precedence constraint on jobs into a chain constraint on "pseudo-jobs" includes the following. Consider any flow with n jobs, where each job $i \in [n]$ has size $s_i$ and processor bound $\delta_i$. The precedence constraints are given by a directed acyclic graph on the jobs, and a pseudo-schedule for the flow is constructed as follows. Allocate each job $i \in [n]$ its maximal number $\delta_i$ of processors, and assign job i the smallest start time $b_i \geq 0$ such that for all $i_1 \prec i_2$ it is true that $$b_{i_2} \geq b_{i_1} + \frac{s_{i_1}}{\delta_{i_1}}.$$

It should be understood that the start times $\{b_i\}_{i=1}^n$ can be computed via dynamic programming. The pseudo-schedule runs each job i on $\delta_i$ processors, between time $b_i$ and $$b_i + \frac{s_i}{\delta_i}.$$

Given an infinite number of processors, the pseudo-schedule is a valid schedule satisfying precedence.

Next, pseudo-jobs corresponding to this flow are constructed. Let $$T = \max_{i=1}^n \left( b_i + \frac{s_i}{\delta_i} \right)$$

denote the completion time of the pseudo-schedule; observe that T equals the critical path bound of the flow. The time interval [0, 7] is partitioned into maximal intervals $I_1, \ldots, I_h$ so that the set of jobs processed by the pseudo-schedule in each interval remains fixed. For each $k \in [h]$, if $r_k$ denotes the total number of processors being used during $I_k$, pseudo-job k is defined to have processor bound $\delta(k):=r_k$ and size $s(k):=r_k \cdot |I_k|$, which is the total work done by the pseudo-schedule during $I_k$. Note that a pseudo-job includes portions of work from multiple jobs; moreover, it is possible that $r_k > P$ because the pseudo-schedule is defined independent of P. Additionally, the chain precedence constraint $1 \prec 2 \prec \ldots h$ is enforced on pseudo-jobs.

By way of example, FIG. 5 is a diagram illustrating a first stage of the techniques detailed herein, according to an aspect of the invention. Specifically, FIG. 5(a) illustrates the directed acyclic graph of a particular flow. The jobs in this flow are numbered as in the first flow of FIG. 1. Also, FIG. 5(b) shows the resulting pseudo-schedule. Jobs 102-118 are shown here with their possible earliest start times in an environment with an infinite number of processors. FIG. 5(c) shows the decomposition into maximal intervals, and FIG. 5(d) illustrates this in a histogram view. Thus, the width of each interval represents the number of processors required during that interval.

As also described herein, the second stage of at least one embodiment of the invention includes scheduling flows with chain precedence constraints. Consider a malleable scheduling problem on P parallel processors with chain precedence constraints and general cost functions. Each chain $j \in [m]$ is a sequence $k_1^j \prec k_2^j \prec \ldots k_{n(j)}^j$ of pseudo-jobs, where each pseudo-job k has a size s(k) and specifies a maximum number $\delta_k$ of processors on which it can be run. Note that the $\delta_k$ s may be larger than P. Each chain $j \in [m]$ also specifies a non-decreasing cost function $\omega_j: \Re_+ \to \Re_+$, where $w_j(t)$ is the cost incurred when chain j is completed at time t. An objective is to find a malleable schedule on P identical parallel processors that satisfies precedence constraints and minimizes the total cost.

Malleable schedules for pseudo-jobs (resp. chains of pseudo-jobs) are defined identically to jobs (resp. flows). To reduce notation, a malleable schedule for chain j can be denoted by a sequence $\tau^j = \langle \tau_1^j, \ldots, \tau_{n(j)}^j \rangle$ of schedules for its pseudo-jobs, where $\tau_r^j$ is a malleable schedule for pseudo-job $k_r^j$ for each $r \in [n(j)]$. Note that chain precedence implies that for each $r \in \{1, \ldots, n(j)-1\}$, the start time of $k_{r+1}^j$, $S(\tau_{r+1}^j) \geq C(\tau_r^j)$, the completion time of $k_r^j$. The completion time of this chain is $C(\tau^j) := C(\tau_{n(j)}^j)$.

Consider the problem of scheduling chains on P parallel processors under a strict deadline metric. That is, each chain $j \in [m]$ has a deadline $d_j$ and its cost function is: $w_j(t)=0$ if $t \leq d_j$, and $\infty$ otherwise.

In an example embodiment of the invention, a natural greedy algorithm can be applied. By renumbering chains, assume that $d_1 \leq \ldots \leq d_m$. The algorithm schedules chains in increasing order of deadlines, and within each chain, the algorithm schedules pseudo-jobs greedily (by allocating the maximum possible number of processors).

A description of such a greedy scheme is depicted in FIG. 6. That is, FIG. 6 is a diagram illustrating a greedy algorithm 602 for scheduling chains with a strict deadline metric, a component of the second stage, according to an aspect of the invention. Note the outer loop on the flows in lines 2-13. The inner loop on the jobs of the flow is given in lines 3-8. Note that the greedy scheme tests whether or not the problem is feasible in lines 10-12, an aspect useful for minimax objective functions.

Additionally, consider the problem of scheduling chains on P parallel processors under arbitrary minisum metrics. Recall that there are m chains, each having a non-decreasing cost function $\phi_j: \Re_+ \to \Re_+$. Such a scheme can operate in two phases. In the first phase, each chain is treated as a certain volume of work, and a minimum cost flow sub-problem is formulated using the cost functions $w_j$s. The solution to this sub-problem is used to determine candidate deadlines $\{d_j\}_{j=1}^m$ for the chains. Further, in the second phase, the algorithm for deadline-metrics is run using $\{d_j\}_{j=1}^m$ to obtain the final solution.

As noted herein, at least one embodiment of the invention includes generating a minimum cost flow. In such an embodiment, each chain $j \in [m]$ is treated as a work of volume $V_j := \tau_{i=1}^{n(j)} s(k_i^j)$, which is the total size of pseudo-jobs in j. Note that a network flow instance includes a directed graph (V, E) with designated source/sink nodes and demand $\rho$, where each arc $e \in E$ has a capacity $\alpha_e$ and cost (per unit of flow) of $\beta_e$. A flow satisfies arc capacities and node conservation (in flow equals out flow), and an objective includes determining a flow of $\rho$ units from source to sink having a minimum cost.

By way of example, the nodes of the flow network include $\{a_1, \ldots, a_m\} \cup \{b_1, \ldots, b_H\} \cup \{r, r'\}$, where r denotes the source and r' the sink. The nodes $a_j$s correspond to chains and $b_t$s correspond to intervals [t-1, t) in time. The arcs include $E = E_1 \cup E_2 \cup E_3 \cup E_4$, where:

$E_1 := \{(r, a_j): j \in [m]\}$, arc $(r, a_j)$ has cost 0 and capacity $V_j$,
$E_2 := \{(a_j, b_t): j \in [m], t \in [H], t \geq Q_j\}$, arc $(a_j, b_t)$ has cost $$\frac{w_j(t)}{V_j}$$

and capacity $\infty$,
$E_3 := \{(b_t, r'): t \in [H]\}$, arc $(b_t, r')$ has cost 0 and capacity $\infty$, and
$E_4 = \{(b_{t+1}, b_t): t \in [H-1]\}$, arc $(b_{t+1}, b_t)$ has cost 0 and capacity $\infty$.

Accordingly, an example embodiment of the invention includes setting the demand $\rho := \Sigma_{j=1}^m V_j$, and computing a minimum cost flow $f: E \to \Re_+$. Notice that, by definition of arc capacities, any $\rho$-unit flow must send exactly $V_j$ units through each node $a_j (j \in [m])$. Moreover, this network flow instance is a valid relaxation of any malleable schedule, so the total cost of flow f is less than or equal to opt, the optimal value of the malleable scheduling instance.

Figure 7:
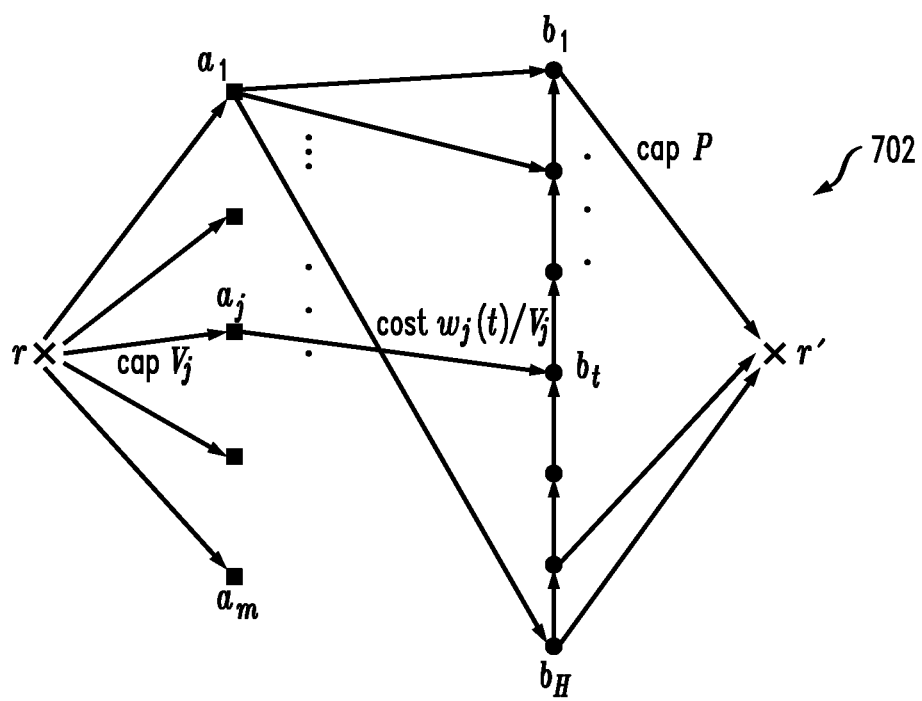
FIG. 7 is a diagram illustrating a minimum cost flow network, another component of the second stage, according to an aspect of the invention.

See FIG. 7 for an illustration of this network, its costs and its capacities. Specifically, FIG. 7 is a diagram illustrating a minimum cost flow network 702, another component of the second stage, according to an aspect of the invention. From left to right in the network 702, there is a source, the chain nodes, the time nodes and the sink. All of the directed arcs are also shown.

Additionally, as detailed herein, at least one embodiment of the invention includes obtaining candidate deadlines. Accordingly, the flow f can be rounded to obtain deadlines $d_j$ for each chain $j \in [m]$. Define $d_{1_j} := \arg\min\{t: \Sigma_{s=1}^t f(a_j, b_s) \geq V_j/2\}$, for all $j \in [M]$. In other words, $d_j$ corresponds to the "half completion time" of chain j given by the network flow f. Because $w_j(\cdot)$ is non-decreasing and $\Sigma_{t \geq d_j} f(a_j, b_t) \geq V_j/2$, it is true that $$w_j(d_j) \leq 2 \cdot \sum_{t \geq d_j} \frac{w_j(t)}{V_j} \cdot f(a_j, b_t),$$

$\forall j \in [m]$.

Note that the right-hand side of the previous equation is at most twice the cost of arcs leaving node $a_j$. Thus, given a schedule that completes each chain j by its deadline $d_j$, the total cost $\Sigma_{j=1}{}^m w_j(d_j) \le 2 \cdot \text{opt}$. Moreover, by definition of the arcs $E_2$, $d_j \ge Q_j \ge$ (critical path of chain j), $\forall_j \in [m]$. Also, by the arc capacities on $E_3$, $\Sigma_{j=1}{}^m \Sigma_{s=1}{}^{\prime} f(a_j, b_s) \le P \cdot t$, for all $t \in [H]$.

By way of illustration, assume a renumbering of the chains in deadline order so that $d_1 \le d_2 \le \ldots \le d_m$. Then, using the definition of deadlines (as half completion times) and the above inequality for $t = d_j$, $$\sum_{\ell=1}^{j} V_j \le 2 \cdot \sum_{\ell=1}^{j} \sum_{s=1}^{d_j} f(a_j, b_s) \le 2P \cdot d_j,$$

$\forall_j \in [m]$.

Further, at least one embodiment of the invention includes solving a deadline-metric sub-problem. Such an embodiment includes applying the algorithm for scheduling with deadline metrics using the deadlines $\{d_j\}_{j=1}{}^m$ computed above.

A similar algorithm can be employed for minimax metrics. For example, such an algorithm assumes a bound M such that $M \le \text{opt} \le (1+\epsilon)M$ for some $\epsilon > 0$, and attempts to find a schedule of minimax cost of at most M. The final algorithm performs a bracket and bi-section search on M and returns the solution corresponding to the smallest feasible M. As with the minisum objective, the algorithm here also relies on a reduction to the deadline metric, as detailed as follows.

Step 1: Obtain deadlines. Define, for each chain, $j \in [m]$, its deadline $D_j := \arg \max \{t : w_j(t) \le M\}$.

Step 2: Solve deadline sub-problem. Run the algorithm for deadline-metrics using the obtained deadlines $\{D_j\}_{j=1}{}^m$. If the deadline algorithm declares unfeasibility, the estimate M is too low. Otherwise, a schedule having minimax cost M is obtained. Start the algorithm with a value M corresponding to the critical path bound.

As also described herein, the third stage of at least one embodiment of the invention includes combining the output of stages one and two, and converting any malleable schedule of pseudo-jobs and chains into a valid schedule of the original jobs and flows. Consider the schedule of each pseudo-job k separately, and using a generalization of McNaughton's Rule, construct a malleable schedule for the (portions of) jobs comprising pseudo-job k. The original precedence constraints are satisfied because the chain constraints are satisfied on pseudo-jobs, and the jobs participating in any single pseudo-job are independent.

Consider any pseudo-job k that corresponds to interval $I_k$ in the pseudo-schedule (recall stage one), during which jobs $S \subseteq [n]$ are executed in parallel for a total of $r_k = \Sigma_{i \in s} \delta_i$ processors. Consider also any malleable schedule of pseudo-job k that corresponds to a histogram $\sigma$ (of processor usage) having area $s_k = |I_k| \cdot r_k$ and maximum number of processors at most $r_k$.

At least one embodiment of the invention also includes shape-shifting a pseudo-schedule for S in $I_k$ into a valid schedule given by histogram $\sigma$. The histogram $\sigma$ is decomposed into intervals $\mathfrak{I}$ of constant numbers of processors. For each interval $J \in \mathfrak{I}$ having width (number of processors) $\sigma(J)$, the work is scheduled from a time $$\frac{|J| \cdot \sigma(J)}{r_k}$$

sub-interval of $I_k$; observe that the respective areas in a and $I_k$ are equal. Because $\Sigma_{J \in \mathfrak{I}} |J| \cdot \sigma(J) = s_k = |I_k| \cdot r_k$, taking such schedules over all $J \in \mathfrak{I}$ gives a full schedule for $I_k$. For a particular interval J, at least one embodiment of the invention includes applying McNaughton's Rule to schedule the work from its $I_k$ sub-interval. McNaughton's Rule functions here as a wrap-around scheme: Order the jobs, and for the first job fill the area vertically, one processor at a time, until the total amount of work involving that job has been allotted. Then, starting where the scheme left off, fill the area needed for the second job, and so on. Accordingly, all appropriate constraints are satisfied.

FIG. 8 is a diagram illustrating a third stage of the techniques detailed herein, according to an aspect of the invention. FIG. 8(a) highlights the first pseudo-job from the last stage one pseudo-schedule. The right-most histogram of FIG. 8(b) illustrates the corresponding portion for this pseudo-job in the stage two malleable greedy schedule; the constant histogram ranges are also shown. The equal area sub-intervals 802, 804, 806, 808 and 810 are shown in FIG. 8(a). Applying McNaughton's Rule to the first sub-interval produces the schedule shown at the bottom of FIG. 8(b). The scheme can then proceed with subsequent sub-intervals.

Figure 9:
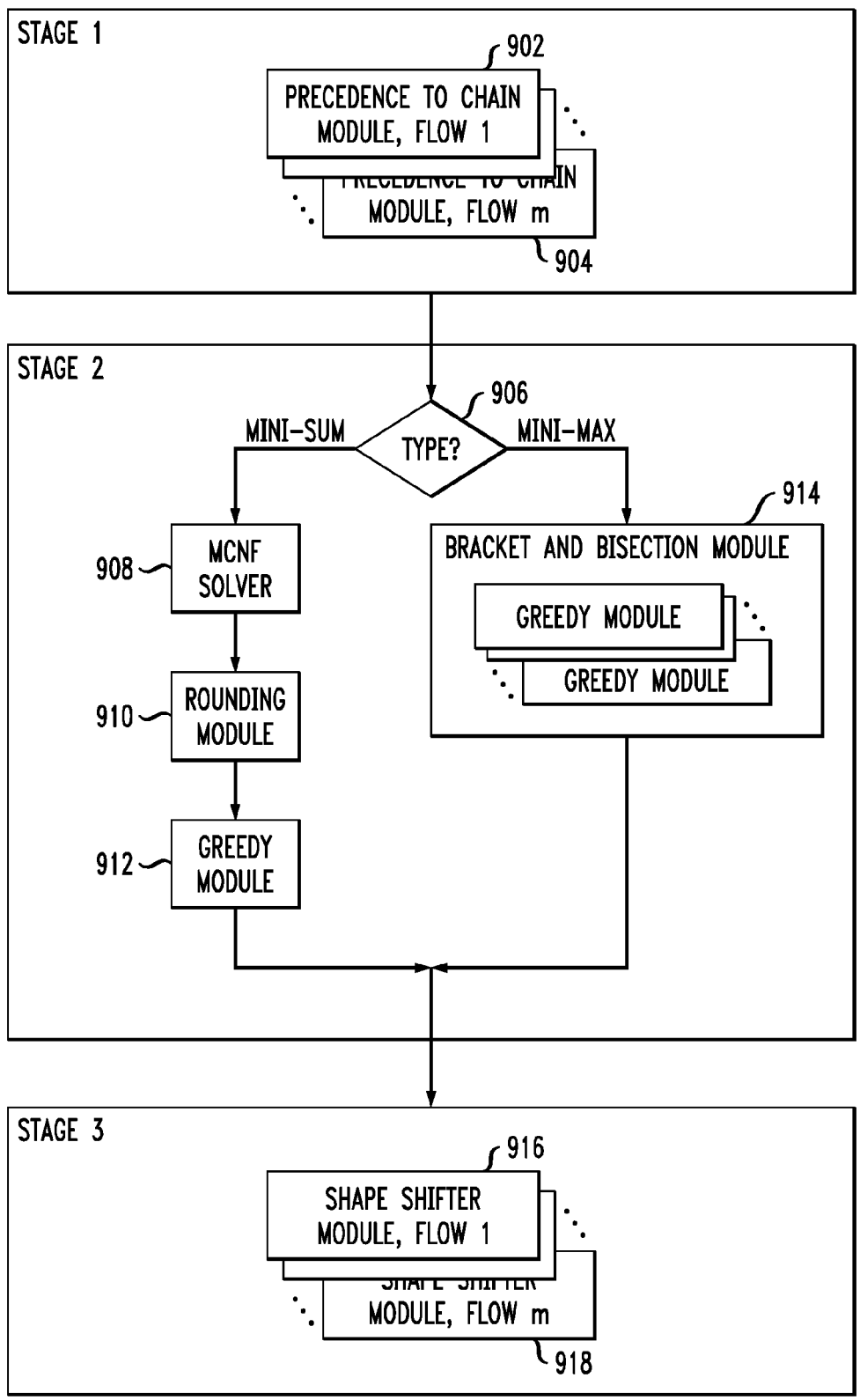
FIG. 9 is a block diagram illustrating an example embodiment, according to an aspect of the invention.

FIG. 9 is a block diagram illustrating an example embodiment, according to an aspect of the invention. Stage 1 includes invocation(s) of a module converting precedence constraints to chains per flow (as illustrated via module 902 and module 904). Stage 2 determines, in step 906, whether the problem is mini-sum or mini-max. If the problem is mini-sum, the minimum cost network flow (MCNF) solver module 908 is invoked. Rounding module 910 rounds the solution to determine an ordering of the chains, and this ordering is used to compute a greedy schedule via greedy module 912.

If the problem is mini-max, bracket and bisection module 914 implements a bracket and bisection algorithm invoking multiple greedy modules until the optimal value is computed. Additionally, as depicted in FIG. 9, stage 3 includes one invocation of the shape-shifter module per flow (as illustrated via module 916 and module 918). At the end of this process, a malleable schedule for the original problem has been determined.

Figure 10:
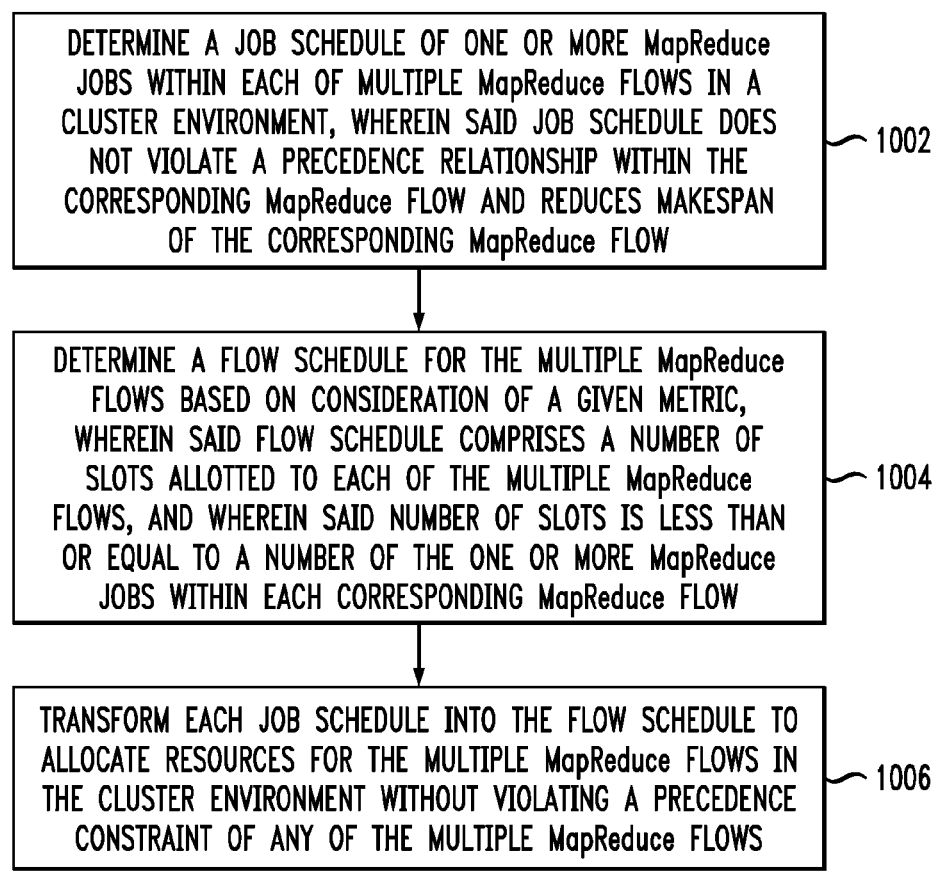
FIG. 10 is a flow diagram illustrating techniques according to an embodiment of the invention.

FIG. 10 is a flow diagram illustrating techniques according to an embodiment of the present invention. Step 1002 includes determining a job schedule of one or more MapReduce jobs within each of multiple MapReduce flows in a cluster environment, wherein said job schedule does not violate a precedence relationship within the corresponding MapReduce flow and reduces makespan of the corresponding MapReduce flow. As detailed herein, determining a job schedule can include assigning each MapReduce job a maximum number of slots corresponding to that MapReduce job.

Additionally, at least one embodiment of the invention includes converting one or more histograms into one or more slot schedules based on the maximum number of slots assigned to each MapReduce job. Further, as described herein, at least one embodiment of the invention includes removing unused slots from the maximum number of slots assigned to each MapReduce job.

Step 1004 includes determining a flow schedule for the multiple MapReduce flows based on consideration of a given metric (for example, a metric associated with completion time of each MapReduce flow), wherein said flow schedule comprises a number of slots allotted to each of the multiple MapReduce flows, and wherein said number of slots is less than or equal to a number of the one or more MapReduce jobs within each corresponding MapReduce flow. The techniques depicted in FIG. 10 can also include selecting an appropriate set of allocations for each MapReduce flow.

Determining a flow schedule can include selecting a number of slots for each MapReduce flow. A flow schedule such as determined in step 1004 can result in performance of the same amount of work for each of the multiple MapReduce flows. Additionally, a flow schedule such as determined in step 1004 can include a scheme pertaining to one or more deadline-based metrics, and/or a scheme pertaining to one or more non-deadline-based metrics.

Step 1006 includes transforming each job schedule into the flow schedule to allocate resources for the multiple MapReduce flows in the cluster environment without violating a precedence constraint of any of the multiple MapReduce flows. Further, in at least one embodiment of the invention, steps 1002, 1004 and 1006 can be executed upon arrival of one or more MapReduce jobs into the cluster environment, upon departure of one or more MapReduce jobs from the cluster environment, upon a transition of one or more MapReduce jobs in the cluster environment, and/or upon completion of a pre-specified interval of time.

The techniques depicted in FIG. 10 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 11:
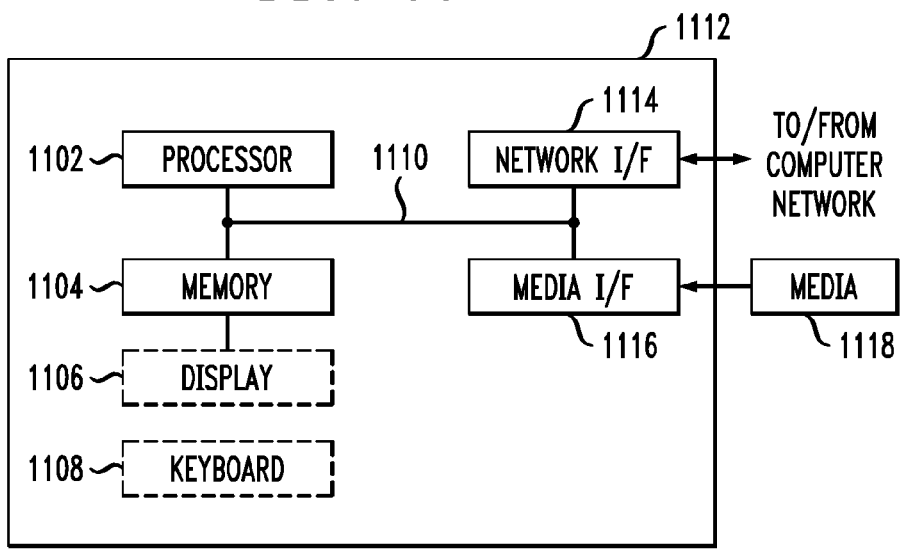
FIG. 11 is a system diagram of an exemplary computer system on which at least one embodiment of the invention can be implemented.

Additionally, an aspect of the present invention can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1102. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, optimizing slot-based scheduling of MapReduce jobs by considering scheduling metrics at the flow-graph level of atomicity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining a job schedule of multiple MapReduce jobs across multiple MapReduce flows in a cluster environment, wherein each of said MapReduce flows comprises two or more of the multiple MapReduce jobs and wherein said job schedule does not violate a precedence constraint of the corresponding MapReduce flow and reduces makespan of the corresponding MapReduce flow, wherein determining the job schedule comprises assigning each MapReduce job a maximum number of identical slots corresponding to that MapReduce job and scheduling the MapReduce jobs in increasing order of start time from smallest to largest;
   determining a flow schedule for the multiple MapReduce flows to optimize a given metric across all of the multiple MapReduce jobs, wherein said flow schedule comprises a number of identical slots allotted to each of the multiple MapReduce flows, and wherein said number of identical slots is two or more;
   transforming each job schedule into the flow schedule; and
   allocating, by using the flow schedule, resources for the multiple MapReduce flows in the cluster environment without violating a precedence constraint of any of the multiple MapReduce flows;
   wherein at least one of the steps is carried out by a computer device.

2. The method of claim 1, wherein said given metric comprises a metric associated with completion time of each MapReduce flow.

3. The method of claim 1, wherein said determining a flow schedule comprises selecting a number of identical slots for each MapReduce flow.

4. The method of claim 1, comprising: converting one or more histograms into one or more slot schedules based on the maximum number of identical slots assigned to each MapReduce job.

5. The method of claim 4, comprising: removing unused slots from the maximum number of identical slots assigned to each MapReduce job.

6. The method of claim 1, wherein said flow schedule results in performance of the same amount of work for each of the multiple MapReduce flows.

7. The method of claim 1, wherein said flow schedule comprises a scheme pertaining to one or more deadline-based metrics.

8. The method of claim 1, wherein said flow schedule comprises a scheme pertaining to one or more non-deadline-based metrics.

9. The method of claim 1, comprising: executing said determining a job schedule, said determining a flow schedule, and said transforming steps upon arrival of one or more MapReduce jobs into the cluster environment.

10. The method of claim 1, comprising: executing said determining a job schedule, said determining a flow schedule, and said transforming steps upon completion of a pre-specified interval of time.

11. An article of manufacture comprising a non-transitory computer readable storage medium having computer readable instructions tangibly embodied thereon which, when implemented, cause a computer to carry out a plurality of method steps comprising:
   determining a job schedule of multiple MapReduce jobs across multiple MapReduce flows in a cluster environment, wherein each of said MapReduce flows comprises two or more of the multiple MapReduce jobs and wherein said job schedule does not violate a precedence constraint of the corresponding MapReduce flow and reduces makespan of the corresponding MapReduce flow, wherein determining the job schedule comprises assigning each MapReduce job a maximum number of identical slots corresponding to that MapReduce job and scheduling the MapReduce jobs in increasing order of start time from smallest to largest;
   determining a flow schedule for the multiple MapReduce flows to optimize a given metric across all of the multiple MapReduce jobs, wherein said flow schedule comprises a number of identical slots allotted to each of the multiple MapReduce flows, and wherein said number of identical slots is two or more;
   transforming each job schedule into the flow schedule; and
   allocating, by using the flow schedule, resources for the multiple MapReduce flows in the cluster environment without violating a precedence constraint of any of the multiple MapReduce flows.

12. The article of manufacture of claim 11, wherein said given metric comprises a metric associated with completion time of each MapReduce flow.

13. The article of manufacture of claim 11, wherein said determining a flow schedule comprises selecting a number of identical slots for each MapReduce flow.

14. The article of manufacture of claim 11, wherein the method steps comprise: converting one or more histograms into one or more slot schedules based on the maximum number of identical slots assigned to each MapReduce job.

15. The article of manufacture of claim 14, wherein the method steps comprise: removing unused slots from the maximum number of identical slots assigned to each MapReduce job.

16. The article of manufacture of claim 11, wherein the method steps comprise: executing said determining a job schedule, said determining a flow schedule, and said transforming steps upon arrival of multiple MapReduce jobs into the cluster environment.

17. The article of manufacture of claim 11, wherein the method steps comprise: executing said determining a job schedule, said determining a flow schedule, and said transforming steps upon completion of a pre-specified interval of time.

18. A system comprising:
   a memory; and
   at least one processor coupled to the memory and operative for:
      determining a job schedule of multiple MapReduce jobs across multiple MapReduce flows in a cluster environment, wherein each of said MapReduce flows comprises two or more of the multiple MapReduce jobs and wherein said job schedule does not violate a precedence constraint of the corresponding MapReduce flow and reduces makespan of the corresponding MapReduce flow, wherein determining the job schedule comprises assigning each MapReduce job a maximum number of identical slots corresponding to that MapReduce job and scheduling the MapReduce jobs in increasing order of start time from smallest to largest;

determining a flow schedule for the multiple MapReduce flows to optimize a given metric across all of the multiple MapReduce jobs, wherein said flow schedule comprises a number of identical slots allotted to each of the multiple MapReduce flows, and wherein said number of identical slots is two or more;

transforming each job schedule into the flow schedule; and allocating, by using the flow schedule, resources for the multiple MapReduce flows in the cluster environment without violating a precedence constraint of any of the multiple MapReduce flows.

19. The system of claim 18, wherein said given metric comprises a metric associated with completion time of each MapReduce flow.

20. The system of claim 18, wherein said determining a flow schedule comprises selecting a number of identical slots for each MapReduce flow.

21. The system of claim 18, wherein said flow schedule results in performance of the same amount of work for each of the multiple MapReduce flows.

22. The system of claim 18, wherein said flow schedule comprises a scheme pertaining to one or more deadline-based metrics.

* * * * *